April 13, 1954
C. C. TAYLOR
2,674,855
ADJUSTABLE HOLDER FOR IRRIGATION STOPS
Filed July 27, 1951
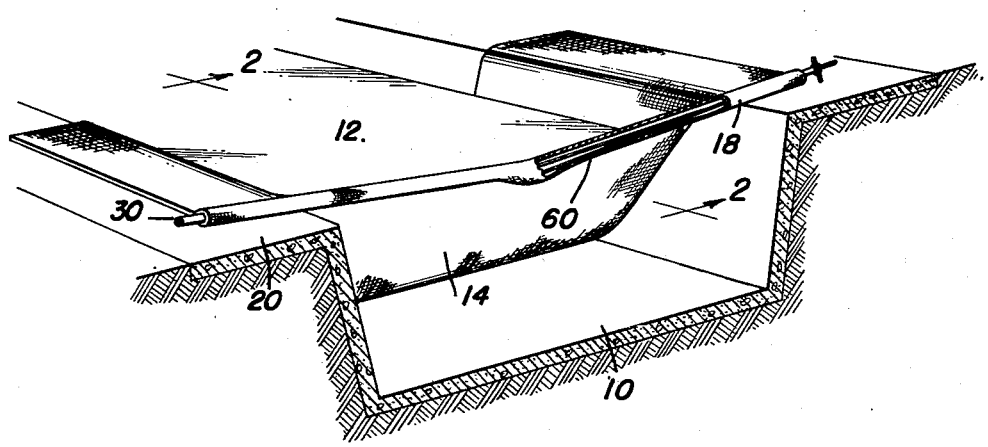
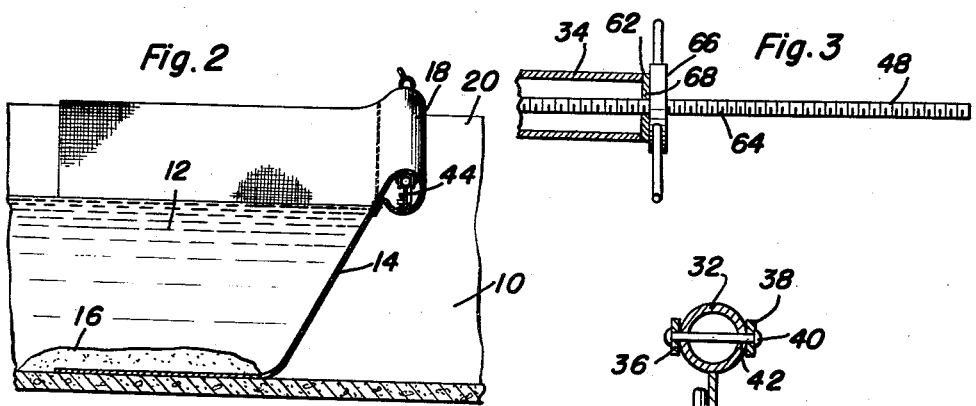
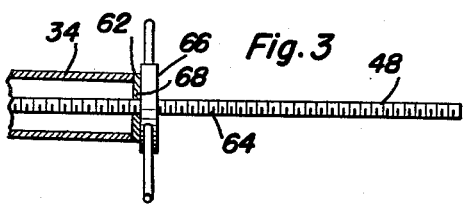
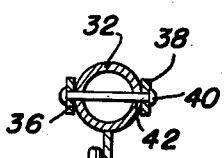
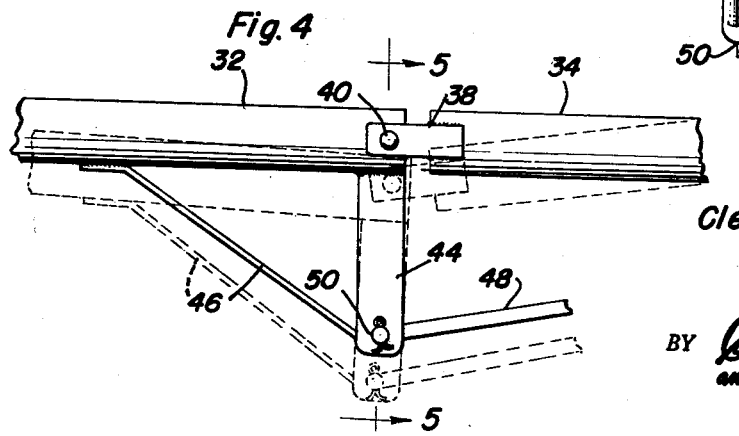
Cleo C. Taylor
INVENTOR.

Patented Apr. 13, 1954

2,674,855

UNITED STATES PATENT OFFICE 2,674,855

ADJUSTABLE HOLDER FOR IRRIGATION STOPS

Cleo C. Taylor, Plainview, Tex.

Application July 27, 1951, Serial No. 238,823

1 Claim. (Cl. 61—29)

This invention relates to an adjustable holder for an irrigation stop and particularly for such a device which can be installed and adjusted without the necessity of getting into the irrigation ditch or other fluid channel.

In the operation of irrigation systems it is frequently desirable to place temporary stops or dams in various irrigating channels to control the amount of flow of water to any particular place, or even at times completely shut off the flow of water from certain sections of the irrigation system. It has long been customary to build such temporary dams or stops by means of cloth aprons which may be adjusted across the irrigation ditch and held in place by means of suitable supports. Where a substantially complete interruption of water flow is to be accomplished there is little difficulty in using such temporary stops, solid supports, such as a scantling, is inserted in the hem of the apron, and the support placed across the ditch with the apron falling into the ditch itself and being sealed into tight contact with the edges and bottom of the ditch easily by means of some weighty object such as dirt, stones or other material placed on the edge of the apron to keep it from being washed or moved from position.

Usually it is desirable to allow a portion of the water to flow over the dam so that a complete interruption of irrigation is not accomplished. When such incomplete stoppage is desired it has heretofore been customary to provide some sort of a hinged support in the apron of the dam and to provide some means for controlling the hinge so that the elevation of the central portion of the dam can be controlled. In the devices heretofore used for such purposes it has been necessary for the operator to get down into the ditch, which is frequently a very disagreeable place to work, in order to properly adjust the hinge arrangement and to control the height of the dam.

The present invention provides an adjustable stop member which can be inserted in the hem of the usual apron and can be adjusted by an operator on the shore or other dry portion adjacent to the edge of the ditch. The adjustable stop member according to the present invention comprises a two-part supporter hinged in the middle and having a hinge control lever rigidly attached to one section of the support adjacent the hinge and having a tension rod secured to the control lever and anchored to the other section at the end remote from the hinge. The elevation of the dam may then be controlled by means of a suitable threaded arrangement on the tension rod so that the tension on the rod may be adjusted at will.

It is accordingly an object of this invention to provide an improved adjustable support for temporary irrigation dams.

It is a further object of this invention to provide an adjustable dam support which may be adjusted by an operator without entering the ditch.

It is a further object of the invention to provide a cheap but efficient dam supporting element.

Other objects and many of the attendant advantages of this invention will be apparent from the following description taken in conjunction with the accompanying drawings in which:

Figure 1 is a perspective view partially in section of an irrigation ditch showing my improved dam support in position;

Figure 2 is a longitudinal, vertical section substantially on the line 2—2 of Figure 1 showing the section through the dam and showing a hinge support of the improved dam support according to this invention;

Figure 3 is a view partly in section showing a method of anchoring the tension rod in a portion of the support member and the application of a tensioning nut thereto;

Figure 4 is an enlarged view of a portion of the supporting member showing the hinge construction and the application of the hinged controlled lever thereto; and Figure 5 is a vertical transverse section substantially on the plane indicated by the section line 5—5 of Figure 4 showing the construction of the hinge and the hinge controlled lever together with the application of the tension rod thereto.

In the exemplary embodiment of this invention a ditch indicated generally at 10 has a quantity of water 12 therein which is to be stopped by means of an apron 14 which is dropped into the ditch 10 and may be sealed to the bottom of the ditch 10 by means of any suitable sealing material such as clay, dirt or other material 16. The apron 14 is usually constructed of cloth, canvas, plastic or other suitable material and is provided with a hem 18 for receiving a suitable support member which is placed across the walls 20 of the ditch 10.

The improved supporting and adjusting member indicated generally at 30 is made of a plurality of sections herein indicated as two sections 32 and 34, which may be constructed of any suitable structural members such as pipe, channel or other well known structural sections. The adjacent ends of the sections are hinged together to provide a hingedly constructed supporting member. While the hinge may be constructed in any suitable manner I have shown here a system particularly suitable for application when the sections 32 and 34 are made of tubular sections such as pipe. A plurality of extensions 36, 38 are weldedly or otherwise rigidly connected to one of the sections such as 34 and extend forwardly and receive a pin, bolt, rivet or other suitable fastener 40 in a hole 42 in the other section 32.

The hingedly connected support member 30 may be adjusted to any suitable elevation by means of a hinge control lever 44 rigidly attached to one of the sections as 32 by any suitable means, such as welding. It is frequently desirable to use a suitable support or strut member 46 to secure complete rigidity of the member 44 with respect to the section 32. The control lever 44 is controlled by means of a tension rod 48 which engages a hole or other opening 50 in the extreme outer end of the member 44. The tensioning rod 48 is anchored at the extreme outer end of the alternate member such as section 34 and is provided with some means for applying tension to the rod to cause operation of the lever 44 to move the sections 32 and 34 to any desired level.

Where the support member 30 is made of tubular sections as herein illustrated the rod 48 may be conveniently anchored to the outer end of the section 34 as shown in Figures 1 and 3 by providing a slot 60 intermediate the ends of the section 34 and extending the rod 48 through this slot and extending beyond the end 62 of the section 34 and providing threads 64 on the outer end of the rod 48 so that a threaded nut-like member 66 may engage the threads 64 and make contact with the end of the section 34 preferably by the interposition of a suitable pressure disk 68.

In the operation of the improved construction referring to this invention, the supporting member will be inserted in the hem of the apron and the entire structure suspended across the ditch and the apron allowed to fall therein after which a few shovelfuls of dirt or other sealing material may be shoveled onto the apron. The tension of the tension rod 48 is then adjusted by means of the screw-threaded member 66 until the dam has been adjusted to its desired height. All of which operations can be performed from a place of comparative comfort alongside the ditch without the necessity of climbing in the mud or dirt of the ordinary irrigation canal.

While a specific embodiment of this invention has been shown and described for the purpose of illustration herein, it will be understood that many changes and modifications can be made therein, without departing from the true spirit of my invention or the scope of the appended claim.

Having described the invention, what is claimed as new is:

An adjustable holder for an irrigation stop comprising a pair of tubular sections, a hinge means securing said sections in substantially aligned position, a control lever rigidly secured to one of said sections adjacent said hinge means, said lever extending substantially perpendicular to said section, the other of said sections having a slot in the side thereof intermediate the ends thereof, said slot being on the side corresponding to said lever and in alignment with said lever, a rod pivotally engaging said lever in spaced relation to said hinge, said rod passing through said slot and extending beyond the end of the section remote from the hinge, that end of the rod adjacent the end of the section being threaded and a threaded nut like member engaging the threads and bearing against the end of the tubular section.

References Cited in the file of this patent

UNITED STATES PATENTS

| Number | Name | Date |
| --- | --- | --- |
| 771,821 | Gleazer | Oct. 11, 1904 |
| 1,057,354 | McIlwain | Mar. 25, 1913 |
| 1,531,626 | Rowntree | Mar. 31, 1925 |
| 1,718,979 | Protzeller | July 2, 1929 |
| 1,784,955 | Ballard | Dec. 16, 1930 |